(12) United States Patent
Vratskides

(10) Patent No.: US 9,641,997 B2
(45) Date of Patent: May 2, 2017

(54) SYSTEM AND METHOD FOR USE IN A CELLULAR COMMUNICATION NETWORK

(71) Applicant: Alexios Vratskides, London (GB)

(72) Inventor: Alexios Vratskides, London (GB)

(*) Notice: Subject to any disclaimer, the term of this patent is extended or adjusted under 35 U.S.C. 154(b) by 0 days.

(21) Appl. No.: 14/850,468

(22) Filed: Sep. 10, 2015

(65) Prior Publication Data

US 2015/0382175 A1 Dec. 31, 2015

Related U.S. Application Data

(63) Continuation of application No. 13/319,457, filed as application No. PCT/GB2010/000949 on May 10, 2010, now abandoned, which is a continuation of application No. PCT/GB2009/001151, filed on May 8, 2009.

(51) Int. Cl.
*H04W 8/06* (2009.01)
*H04W 48/16* (2009.01)
*H04W 84/04* (2009.01)

(52) U.S. Cl.
CPC ............ *H04W 8/06* (2013.01); *H04W 48/16* (2013.01); *H04W 84/045* (2013.01)

(58) Field of Classification Search
CPC ...... H04W 48/16; H04W 24/06; H04B 7/266; H04B 17/004; G01R 29/105
USPC .................................... 455/435.1, 423, 424
See application file for complete search history.

(56) References Cited

U.S. PATENT DOCUMENTS

| 7,412,224 | B2 * | 8/2008 | Kotola | H04W 4/008 |
| | | | | 348/14.01 |
| 2004/0235422 | A1 * | 11/2004 | Messano | H01Q 1/526 |
| | | | | 455/67.11 |
| 2006/0073788 | A1 * | 4/2006 | Halkka | H04M 1/72572 |
| | | | | 455/41.2 |
| 2007/0184827 | A1 * | 8/2007 | Jin | H04M 1/24 |
| | | | | 455/423 |
| 2008/0129615 | A1 * | 6/2008 | Breit | G01R 29/105 |
| | | | | 343/703 |

(Continued)

OTHER PUBLICATIONS

ETS-Lindgren 5240, Jul. 2009.*

*Primary Examiner* — William Nealon
(74) *Attorney, Agent, or Firm* — Pepper Hamilton LLP

(57) ABSTRACT

Embodiments of the present invention provides a system and method for extracting information pertaining to a portable wireless communications device (103) which is connectable to a cellular communication network comprising the steps of: disposing the portable wireless communications device within an enclosure (101) substantially impenetrable by electromagnetic radiation; generating a cell of a cellular communication network within the enclosure; transmitting a signal to the device, the transmitted signal being suitable for initiating registration of the device with the generated cell; receiving a signal from the device comprising information pertaining to the device, the received signal being suitable for registering the device with the generated cell; and extracting information pertaining to the device from the received signal. Embodiments also provide the additional step of generating a message dependent upon the extracted information and transmitting the same, via the generated cell, to the user's device.

24 Claims, 5 Drawing Sheets

(56) References Cited

U.S. PATENT DOCUMENTS

2010/0113011 A1* 5/2010 Gregg .................. H04W 24/06
455/425
2010/0190451 A1* 7/2010 Huber .................. H04W 24/06
455/67.14

* cited by examiner

SYSTEM AND METHOD FOR USE IN A CELLULAR COMMUNICATION NETWORK

This application is a continuation of U.S. patent application number 13/319,457, filed Dec. 13, 2011, which is a national phase filing under 35 U.S.C. §371 of international patent application number PCT/GB2010/000949, filed May 5, 2010, which is a continuation/PCT international application claiming priority to international patent application number PCT/GB2009/001151, filed May 8, 2009, each of which is hereby incorporated by reference in its entirety.

The present invention relates to a system and method for extracting information pertaining to a mobile wireless communications device which is connectable to a cellular communication network.

In a mobile phone retail environment, in order to serve a current or potential new customer who is already a mobile phone user, and to provide relevant offers and promotions to the customer, there is often a need to know certain pieces of information relating to the user's mobile phone. Amongst the information that it would be advantageous to know is the identity of the mobile phone network that the customer presently uses as well as which mobile phone handset the customer currently has. Armed with such information, a salesperson could then offer the customer information, new deals, packages and/or upgrades which are relevant and individually customised based on the information.

Typically, in order to ascertain the desired information from the customer, it would be necessary for a salesperson to engage with the customer and ask for the necessary information. However, this occupies the salesperson's time and thus prevents the salesperson from carrying out other tasks and duties. Furthermore, the customer may well not actually know offhand the necessary information.

The present invention is as set out in the independent claims.

Embodiments of the present invention improve the efficiency with which a customer can be served by providing a system and method through which information pertaining to a user's mobile phone can be obtained with at least reduced, or preferably independent of, human interaction. Preferably, real-time acquisition of information relating to the user's mobile phone is effected by automatically extracting information pertinent to the user's phone from the user's phone itself and information relating to the user's mobile phone is determined therefrom, such as the user's current network operator and the user's mobile phone handset model. Accordingly, a rapid determination, recognition and identification of information can be made. Furthermore, embodiments enable a message to be automatically generated and transmitted directly to the user's mobile phone without requiring advance knowledge of the user's mobile phone number. The message can be individually customised based on the extracted information and determined information. Further embodiments provide the customer with an interactive user experience via their own mobile phone.

Embodiments of the invention provide the possibility of facilitating the identification of a potential customer as soon as they enter a retail facility such as a store or shop. Embodiments of the invention improve the efficiency with which a customer can be served thereby freeing up a salesperson to deal with other easterners and carry out other tasks and duties.

Other features and advantages of embodiments of the present will become apparent from the following detailed description. It should be understood, however, that the detailed description of specific embodiments is given by way of non-limiting example only, with reference to the accompanying drawings, in which.

Figure 1:
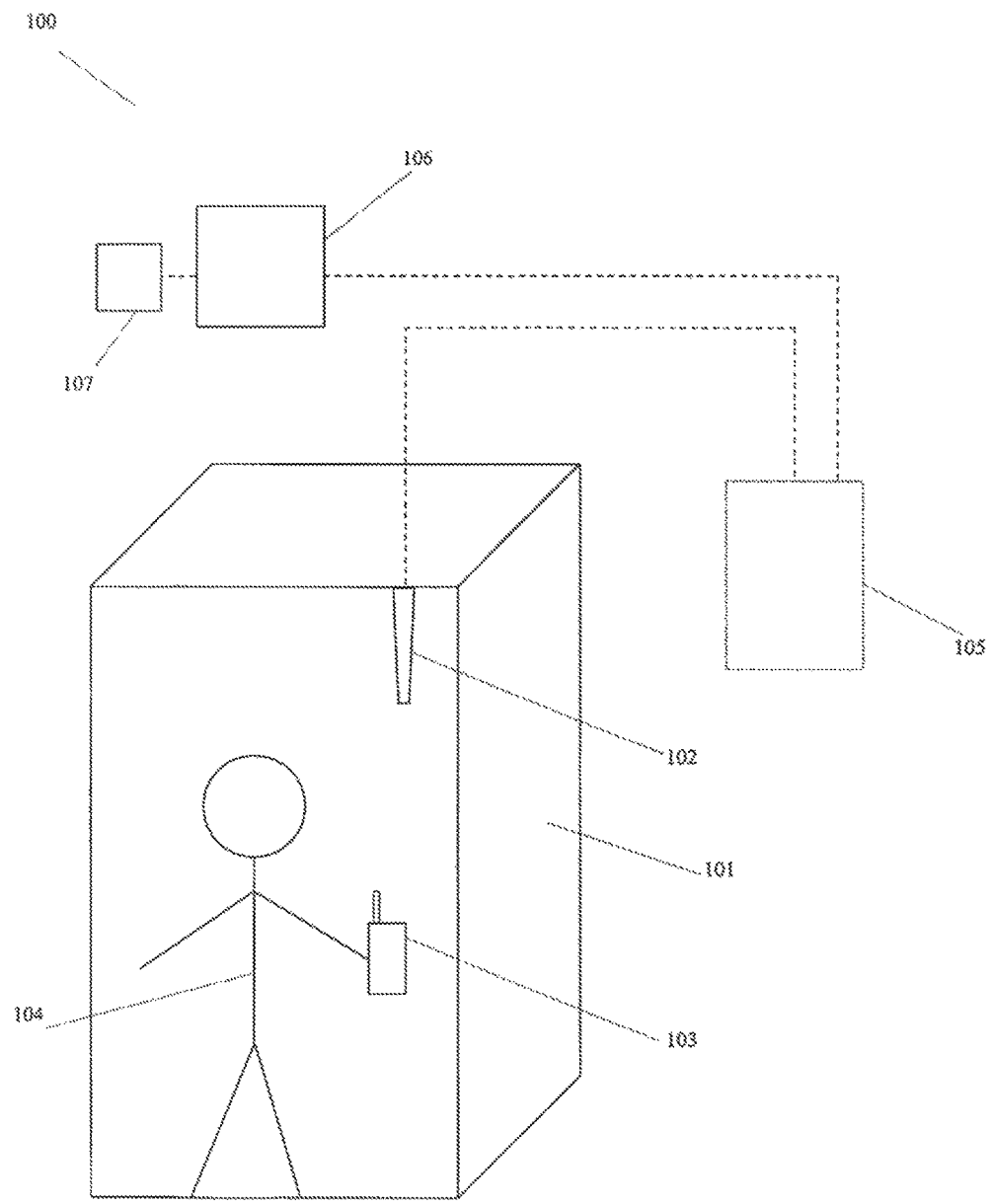
FIG. 1 shows a schematic view of a system according to a first embodiment of the present invention.

Referring to FIG. 1, the system 100 comprises an enclosure or housing 101 that is suitably dimensioned, e.g. height 2.2 m, width 1 m and depth 1 m, such that a single user 104 can be comfortably accommodated therein and completely surrounded thereby.

The enclosure is designed as an individual booth, e.g. in the form of a traditional telephone box with a door (not shown) that the user can open to enter into the booth and close once inside.

The enclosure is structured and formed of a material such that it is substantially impenetrable by and impervious to electromagnetic radiation, i.e. such that it blocks any external EM signals from entering the enclosure, thus shielding or isolating the interior of the enclosure from external electromagnetic radiation, specifically electromagnetic radiation at the frequencies typical of mobile phone usage, such as within the range of 850 MHz to 2100 MHz for GSM 2G and GSM 3G.

Electromagnetic frequency (EMF) shielding centres around the fact that high frequency electromagnetic radiation is reflected off a conducting material. This is due to the rapidly changing magnetic fields of the EMF radiation generating local eddy currents in the conducting material whose magnetic components cancel out the magnetic fields of the EMF radiation.

Several factors limit this behaviour and dictate the effectiveness of a particular conductor when used as an EMF shield. Such factors include:

a) the conductor's electrical resistance. This is the outcome of intrinsic conductivity of the conductor material along with specific configuration parameters such as shape and depth as well as environmental conditions such as temperature;

b) holes in the conductor whose dimensions are greater than the wavelengths of the electromagnetic radiation. These impede the formation of local currents thus would allow EMF radiation to pass through the conductor. Preferably, any holes would be an order of magnitude less than the wavelength of the electromagnetic radiation to be shielded from. Thus, for example, in order to effectively shield against EMF radiation of a frequency of 2100 MHz holes of greater than 1 cm in diameter are avoided;

c) the time delay in forming eddy currents. This is significant in very high frequency EMF radiation. Radiation is absorbed onto the conductor up to a certain depth known as the skin depth. For an EMF shield to be effective, the thickness of the material used should exceed this skin depth.

Examples of possible materials suitable for providing EMF shielding and insulating the enclosure against transmission therethrough of electromagnetic radiation include:

magnetic wood panelling;

a layer of conductive material, such as nickel-zinc ferrites sandwiched between two wooden panels;

metallic wire mesh: a metallic wired mesh forming a Faraday cage placed inside another building material;

conductive glass: specifically prepared glass that behaves as a metal conductor in the absence of metallic meshes;

adhesive window shielding: thin adhesive metal-based meshes that adhere to glass retaining a high degree of transparency;

paint: infused paint with conductive particles, such as halloysite (nanotubes coated with copper) can be used to coat regular building materials;

microwave-like shielding fabric: a stretchy silver coated sheer nylon weave used to coat the interior of both windows and regular building material;

metallised fabrics: fibres of metals such as copper and nickel are blended or woven together in layers to create flexible shielding surfaces that can applied throughout the interior of the enclosure.

A transmitter and a receiver, or alternatively a transceiver 102, are placed within the EMF shielded enclosure.

Preferably, the enclosure is designed to be as small as possible whilst still comfortably accommodate a user and any necessary computing hardware, for example so as to allow several enclosures to be placed in an individual store. Furthermore, by reducing the dimensions of the enclosure, this additionally reduces the costs in manufacturing the enclosure and the cost of providing the enclosures with electromagnetically shielding material.

The internal transceiver is controlled by a controller 105 such that it generates a radio cell of a cellular communication network within the enclosure. In light of the small dimensions and range of the radio cell which is generated and contained within the EMF shielded enclosure, the radio cell can be referred to as a "femtocell" or an access point base station. A femtocell provides much of the same functionality as a typical base station but in a much smaller scale whilst allowing self contained deployment. The femtocell can be connected to a service provider, e.g. through an internet connection. The femtocell is capable of supporting, i.e., registering with and connecting, a small number of mobile phones for example under 10, preferably, 1 to 5 or yet more preferably just a single mobile phone.

A user's mobile phone, when outside of the EMF shielded enclosure, is able to receive signals from a base station of a cell of the user's normal/home network operator and remain connected thereto. However, once the user enters the enclosure along with his mobile phone, since the enclosure is electromagnetically shielded so that external electromagnetic radiation cannot pass through into the internal volume of the enclosure, the mobile phone can no longer receive signals external of the enclosure and thus looses reception and coverage to its home network and the cell with which it was formerly connected to prior to entering the enclosure. The mobile phone is arranged such that it is either connected to a network cell or is looking for one to connect to. Thus, once inside the enclosure and shielded from all external radiation and signals from external cells and base stations, the mobile phone is forced to roam to seek out a new radio cell and/or network with which to register and attempt to connect. Since no external signals can permeate through the enclosure, the only signals that the roaming mobile phone receives are those of the femtocell generated within the enclosure.

Not only does the EMF shield of the enclosure ensure that a user's mobile phone, when within the enclosure, does not receive a signal from external base stations and would be forced to connect to the local femtocell within the enclosure, bat also the shielded enclosure has the additional advantage that the signals generated from within the enclosure are not able to pass through to the outside of the enclosure. Thus, not only are external signals blocked from entering into the enclosure and interfering with the femtocell therein, but also, internal signals generated within the enclosure are blocked and prevented from escaping out of the enclosure and interfering with external cells.

By agreeing to enter into the EM shielded enclosure, it can be made known to the user that the user is consenting to allow a loss of coverage of his normal network and connection to the femtocell as well as the extraction of information pertinent to the user's mobile phone, such as its current network and handset model.

The femtocell generated within the enclosure is arranged so as to carry out a registration or handshake protocol with the phone, comprising authentication and authorization processes between the mobile phone and the internal femtocell, so as to allow and affect the registration and connection of the mobile phone with the femtocell within the enclosure. In the protocol, signals are exchanged between the phone and the femtocell which are representative of information pertaining to the phone.

During the registration process, the femtocell's transmitter transmits a registration signal to the mobile phone within the enclosure which informs the mobile phone of the femtocell's presence and effects the initiation of the registration of the mobile phone with the femtocell. Upon receipt of the registration signal from the transmitter, the mobile phone sends a response signal which is received by the femtocell its receiver. During the transmission and receipt of signals between the mobile phone and the transceiver to effect the registration of the mobile phone with the femtocell, two pieces of information pertaining to the mobile phone are passed from the mobile phone to the femtocell.

One of these pieces of information is the International Mobile Subscriber Identity (IMSI). This is a unique number that is associated with GSM and UMTS mobile phone users. This number is stored in the SIM card of the mobile phone and is itself comprised of three parts:

i) Mobile Country Code (MCC): a three digit code identifying the country in which the user's network operator belongs to;

ii) Mobile Network Code (MNC): a two or three digit code identifying the user's network operator; and iii) Mobile Station Identification Number (MSIN): a code that uniquely identities the user within the operator's customer base.

The other piece of information pertaining to the mobile phone that is transmitted from the mobile phone to the femtocell is the International Mobile Equipment Identity (IMEI) number. This is a unique number that identifies the specific handset of the user's mobile phone. This number itself consists of several parts, one of which, the Type Allocation Code (TAC), contains a unique identifier of the mobile phone's model.

The IMSI and IMEI information contained in the signal sent from the mobile phone to the femtocell is extracted by a processor 106 which is in communication with the femtocell. The extracted information can thereafter be stored in a data storage device 107. The processor and data storage device can take the form of a conventional PC or a server located either locally or remote from the enclosure. The data storage device additionally stores a database of IMSI, MCC, MNC, MSIN, IMEI and TOC numbers cross-referenced with respective names of mobile network operators and details concerning the mobile phone handset. The database is thus used so as to determine, from the extracted information, which mobile network operator the user currently has as well as details concerning the user's mobile phone handset.

Accordingly, based on the signals received from the user's mobile phone within the enclosure, the IMSI and IMEI numbers can be automatically extracted and then used to identify, determine and collect additional information such as:

the mobile network that the user is currently subscribed to;
the brand and model of the user's mobile phone;
a unique code to identify the user.

With such further information, which is also stored, a mobile phone retailer would be able to provide the user with individually customised information and bespoke upgrade offers, for example, offers which are dependent on the user's current network and the user's current brand and model of mobile phone.

In an alternative embodiment, during the registration process of the mobile phone with the femtocell within the enclosure, once the mobile phone has transmitted its MNC and the mobile phone's current home network operator has been determined, this information is used by the femtocell so as to emulate a base station having the parameters necessary in order to correspond to a base station of the user's current network operator. By doing so, advantageously, a network or SIM locked mobile phone would be able to register and connect within the emulated femtocell within the enclosure.

Following the registration process, the mobile phone can register and be connected with the femtocell within the enclosure. Thereby, communication can be initiated with mobile phone via the femtocell within the enclosure and messages can be freely transmitted directly to the mobile phone from the femtocell, without even requiring the user's mobile phone number.

The processor is further arranged so as to generate a message for transmission, via the femtocell, to the registered and connected mobile phone within the enclosure. The message could be for example an Short Message Service (SMS) text message, a Multimedia Messaging Service (MMS) message, an e-mail, a pre-recorded voice message, an Interactive Voice Response (IVR, i.e. an automated call comprising an interactive pre-recorded voice message whose delivered responses depends input from the user, e.g. input tones from the mobile phone's keypad or voice recognition when the user speaks into his mobile phone) or a live voice call for example from a call centre. Alternatively a data file could be send to the user's mobile phone.

The extracted information, and/or the additional information determined therefrom, is used to determine the content of the message. Accordingly, the content of the message that is generated and sent to the user's mobile phone can be individually customised based on the information extracted from the mobile phone in order to make the message more relevant to the particular user based on the network operator he currently uses and the mobile phone he currently has.

In addition to storing information extracted and determined from the user's mobile phone along with a unique identifier corresponding to the user, the database can store further information relevant to the user, such as a record of the number of visits that the customer has made to the enclosure as well as updates of extracted and determined information based on subsequent uses of the system. Such information, or any other information that might be available or previously obtained, for example the user's name, can be used to customise further a message generated and sent to the user's mobile phone.

Optionally, the enclosure could be sufficiently large so that additional computing hardware used to generate the cell, such as the controller, could be located within the enclosure. However, it would be understood by a person skilled in the art that such computing hardware could be equally well connected to the internal transceiver via a wired connection through the enclosure thereby allowing the transceiver to communicate with external computing hardware and remote computing hardware such as a server via a further a communication network such as a LAN, WAN of the Internet. Accordingly, the controller may be positioned inside the enclosure; or it may be positioned outside the enclosure and linked to the transceiver by, for example, a network connection, which may be a wired or a wireless connection.

Figure 2:
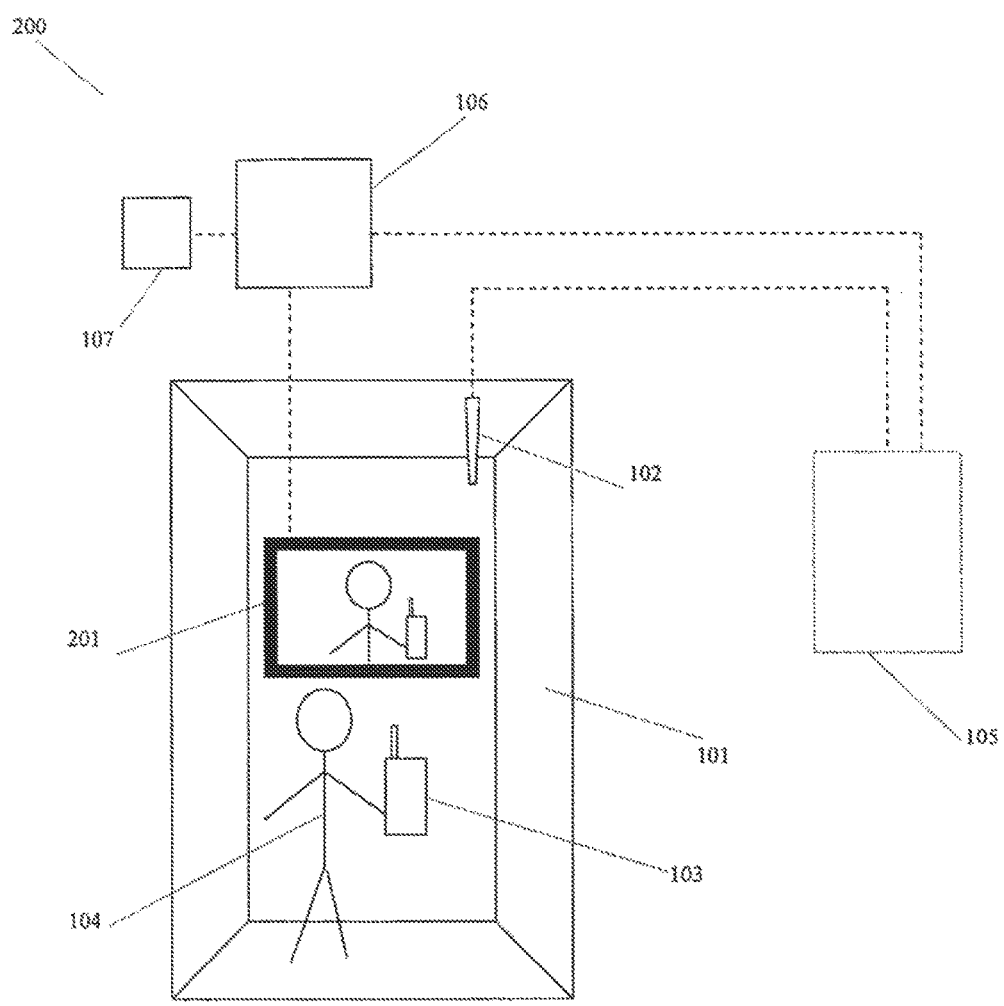
FIG. 2 shows a schematic view of a system according to a second embodiment of the present invention.

A further embodiment of the invention is shown in FIG. 2. In order to provide an audiovisual experience of the user, the system 200 further comprises a visual display 201 within the enclosure. The visual display is arranged so as to display information or show: a pre-recorded video, an interactive pre-recorded video or live video. As with the message generated and transmitted directly to the user's mobile phone, the content that is displayed to the user can likewise be dependent on the extracted information and/or the determined additional information. Furthermore, where the user was listening to a pre-recorded voice message or interacting with an interactive voice response with his mobile phone, the display could show a video of a person talking to the user on a mobile phone with the video, e.g. the person's lips, being synchronised so as to correspond to the voice the user is hearing through his mobile phone.

The display is coupled, locally or remotely, to the server and its processor and database so as to provide the display with the information required for display to the user.

Figure 3:
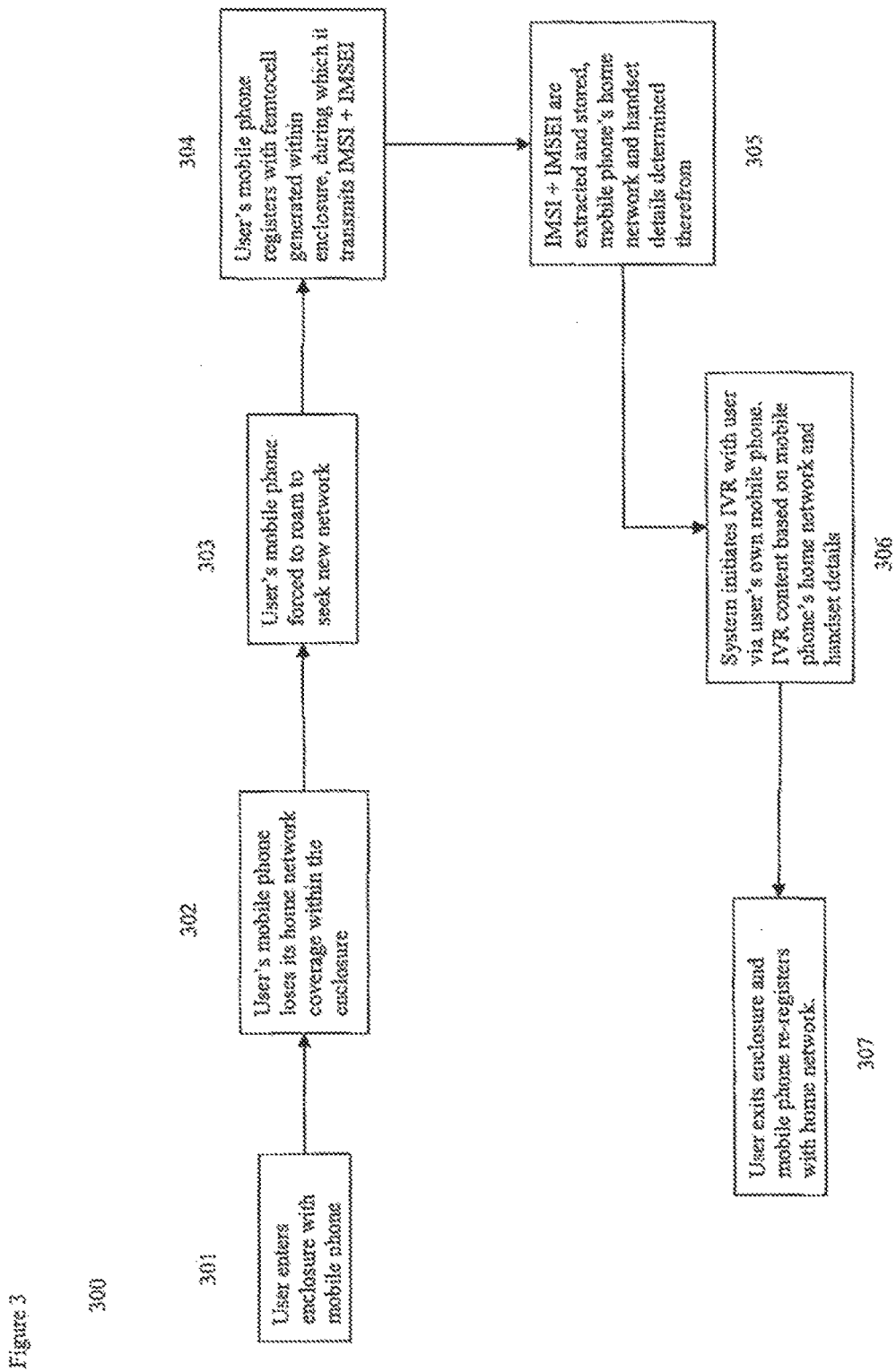
FIG. 3 shows a flow chart of the process involved in the second embodiment.

The flowchart 300 of FIG. 3 provides an exemplary overview of the steps involved in the second embodiment. Firstly, at step 301, a user enters the enclosure with her mobile phone. By doing so, the user implicitly consents to allowing her mobile's borne network coverage to be temporarily blocked whilst within the enclosure and information pertaining to her mobile phone to be extracted. At step 302, once inside the enclosure, the mobile phone is unable to receive any external signals and the mobile phone loses coverage and connection to its home network. This causes the mobile phone to roam to seek a new visiting network with which to register and connect with as in step 303. In step 304, the mobile phone registers with the femtocell generated within the enclosure since the femtocell is the only cell available to the mobile phone. During the registration process information pertaining to the mobile phone, such as its IMSI and IMSEI, is transmitted to the femtocell. In step 305, the IMSI and IMSEI are extracted and stored. Furthermore, by making use of a database correlating IMSI and IMSEI numbers with various network operators and mobile phone handsets' make and model details, the mobile phone's home network and handset details are determined from the extracted information. At step 306, the system initiates an interactive user experience with the user, namely an interactive voice response with two way communication via the user's mobile phone along with a related and synchronised video displayed on a display inside the enclosure. The content of the interactive voice response and the video displayed is based on the current network and current mobile phone handset that the user has which has been determined from information automatically extracted from the mobile phone during the registration process of the mobile phone with the femtocell. The user can interact with the IVR and select various options, for example, either via pressing a button on her mobile phone's keypad of by speaking into her mobile phone. Once the interactive voice response session has been completed, the user exits the enclosure whereupon her mobile phone is once more able to access external signals and re-register with her normal home network in a conventional manner.

Figure 4:
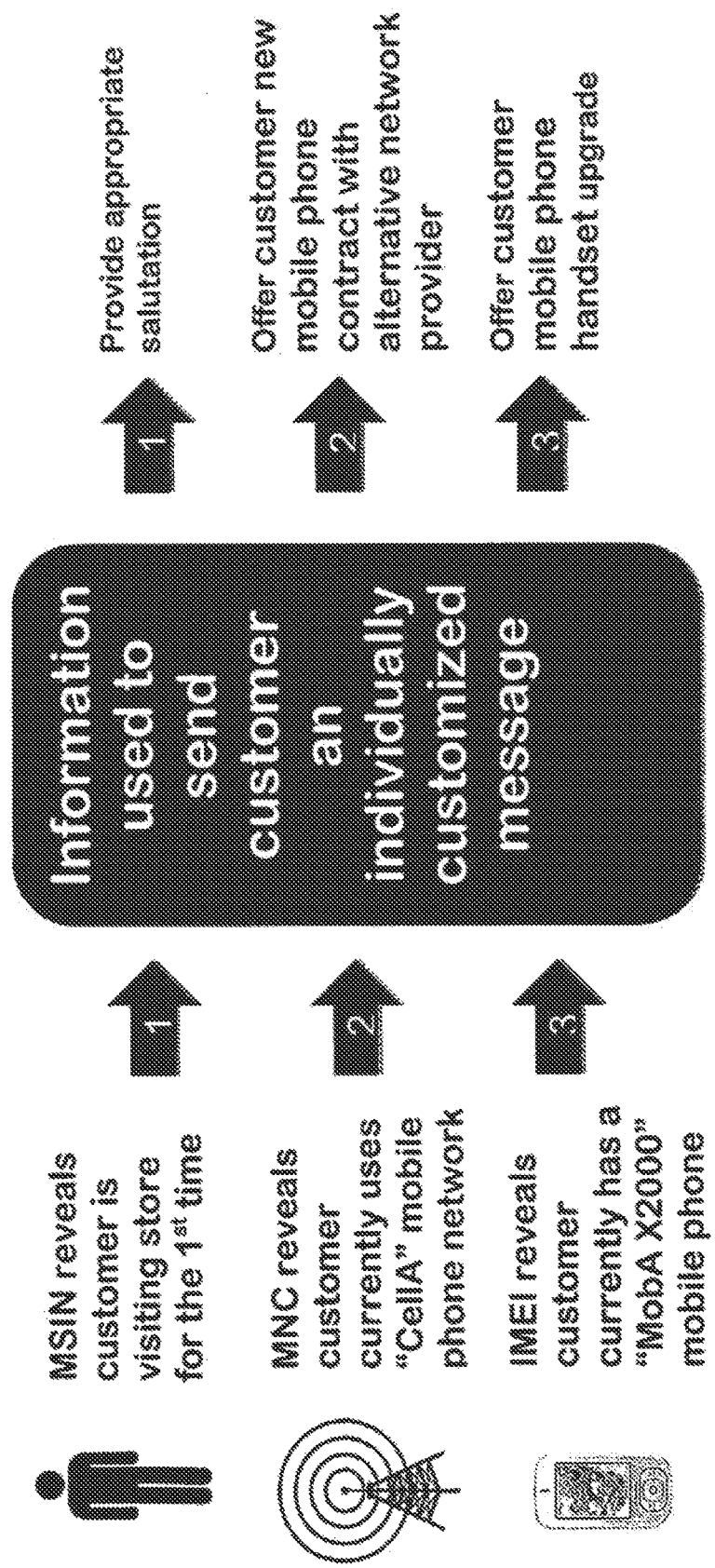
FIG. 4 shows an example of information that can be derived from information extracted from a user's mobile phone.
Figure 5:
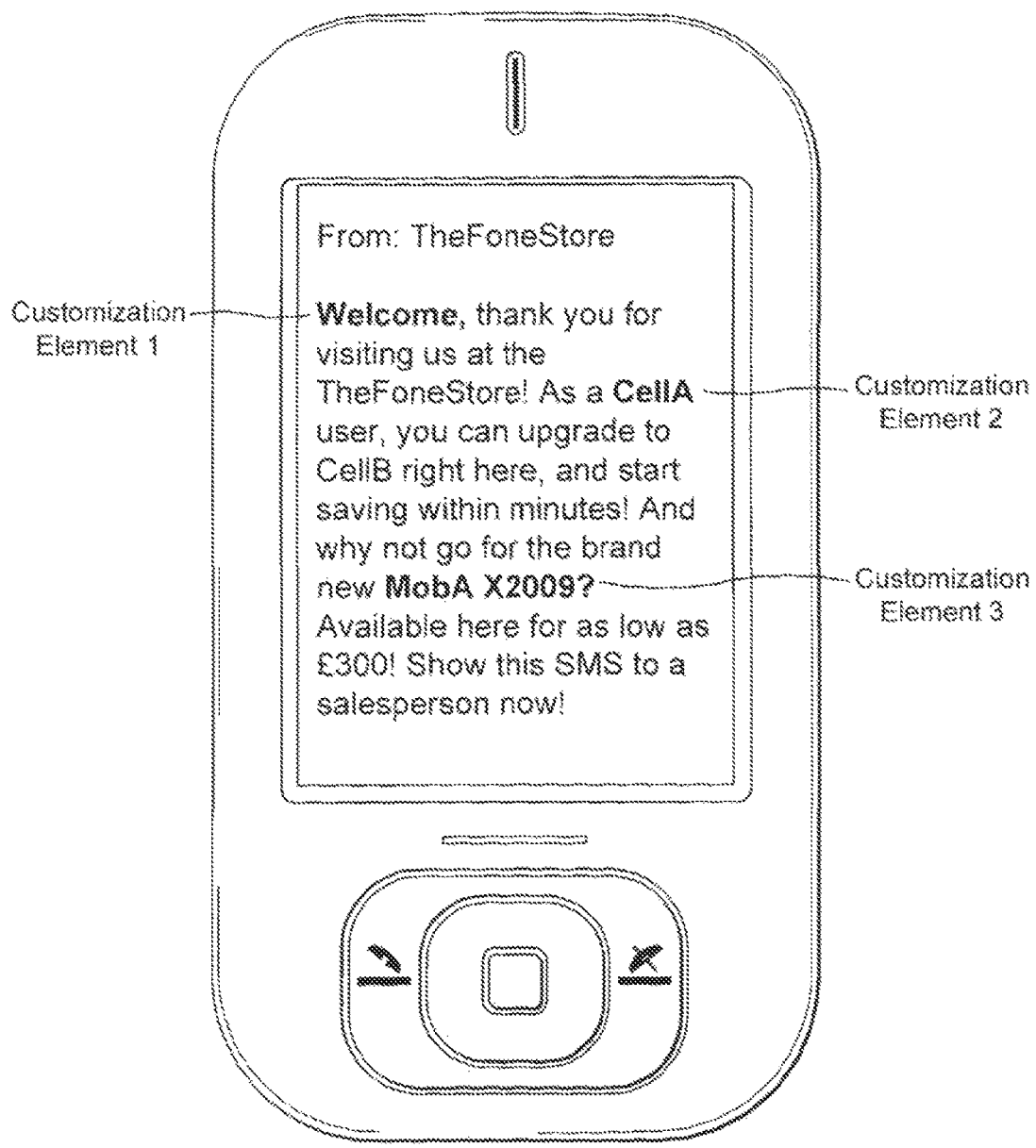
FIG. 5 shows an exemplary customised message sent to a user's mobile phone.

FIGS. 4 and 5 show examples of the type of information pertinent to a mobile phone that can be extracted and determined with embodiments of the present invention as well as the application of such information in the generation and transmission of an individually customised message sent to the user's mobile phone via the femtocell within the shielded enclosure. The unique MSIN number extracted fern the phone can be used to identify uniquely the user, or more precisely the user's handset. A record could be kept of the number of times the user/user's handset has been used with the system. Furthermore, a profile of the user could be built up attributed to the user by storing all of the extracted information and additional information determined therefrom from each visit.

With such information, the system can know, for example, whether or not a user is a new user or whether or not they have previously visited. This can be used to provide an appropriate salutation, as per Customised Element 1, depending on whether or not the user is new or has used the system before, i.e. "Welcome" as opposed to "Welcome back". Where the system to be provided with the user's name, this could be attributed to the user's record, and further used in the message to individually name and greet the user.

Likewise, from the MNC, the user's current network provider can be determined and a recited in the message, as per Customised Element 2. Also, from the IMEI, the mobile phone handset details can be derived and recited, as per Customisation Element 3.

Of course, the generated message need not merely recite information derived from the extracted information into a pre-formed template, but also the actual template that is used could vary depending on the extracted information, further enhancing the ability to customise the message generated and sent to the user's mobile phone. As an example, were the user already to belong to a certain network, the message would not offer deals on a new network but would instead offer an upgrade for the user's phone. Likewise, were the user already to have a top of the range mobile phone handset, the message would forgo offering a new handset but could instead offer an upgrade network package.

Whilst the above embodiments have been discussed with regards to a mobile phone, i.e. a mobile cellular phone, it would be apparent to a person skilled in the art that other portable wireless communications devices having cellular connectivity would be equally suitable such as a laptop, a PDA, or a pocket PC connectable to a cellular communication network.

Whilst the above embodiments have been discussed with the enclosure dimensioned so as to correspond to a traditional telephone booth, i.e. sized so as so comfortably accommodate a single user, it would be apparent to a person skilled in the art that other shapes and dimensions of enclosures would be equally usable. As an example, the enclosure could be larger than a booth for a single occupant. The EMF shielded enclosure could be suitably structured and dimensioned so as to: accommodate more than 1 user, e.g. 2 users or a group of users. The cell generated within the enclosure would likewise be arranged to register and connect with the mobile phone of each of the 2 or more users. Alternatively the enclosure could be formed so as to completely surround and enclose an entire room, shop or retail outlet. The enclosure could, for example, enclose part or all of a movie theatre. The corresponding radio cell generated within such larger enclosures, e.g. up 500 m$^2$, could be referred to as a "picocell" or even "microcell" and would be able to support 2 or more mobile phone registrations and connections. The femtocell or picocell generated within the EMF shielded enclosures of embodiments of the present invention could have a range of up to the order of 200 m, whilst a microcell could have a range up to 500 m. Embodiments having such cells generated within enclosures contrast to a typical cell i.e. a macrocell or base station of a conventional cellular network, which can have a range of over 100 km.

In a further embodiment, the shielded enclosure need not be dimensioned so as to accommodate just a single user or a plurality of users, e.g. the enclosure having each of a height, width and depth of less than 10 m. Instead, the enclosure could fee on a much smaller scale and dimensioned so as to completely surround and accommodate just a mobile phone or a plurality of mobile phones along with a transceiver to generate a picocell within the micro-enclosure, e.g. the enclosure having each of a height, width and depth being less than 1 m. As with previous embodiments, with such an arrangement having a micro-enclosure, information pertinent to the mobile phone could still be extracted, determined and stored. The information can then be used to generate and send to the mobile phone(s) e.g. an individually customised SMS or MMS message for subsequent viewing by the user when the mobile phone is removed from the micro-enclosure.

In a yet further alternative for the shielded enclosure could itself be mobile, e.g. additionally comprise wheels, or be formed as part of a vehicle such as a trailer, car, bus or coach.

In another embodiment, a single controller is used to control multiple transceivers, each transceiver associated with—such as by being placed inside—a respective enclosure.

It is envisaged that the arrangements described in one, more or all of the embodiments described herein may be interconnected via a network such that they can be managed and monitored from a central location. For example, examples of the different forms of enclosure described herein may be interconnected in this way.

In one, more or all of the embodiments described herein, it is envisaged that the controller may comprise at least one of:

An off-the-shelf base station controller, such as those currently available and used to control base stations in existing cellular communication networks.

A computer running software that emulates the functionality of a base station controller.

A link to a cellular network operator's existing base station or network of base stations such that the transceiver is controlled thereby.

Custom hardware such as a programmable logic device (PLD) configured to emulate the functionality of a base station controller, Embodiments may include using the system as a means to automatically identify a person based on their mobile device. This may be the sole purpose of the system, or this may form just part of the purpose of the system which might then provide other services. Accordingly, at least some example methods that embody the invention may comprise extracting from the received signal information that identifies the user of the device. The information that identifies the user may comprise the Mobile Station Identification Number that forms part of the International Mobile Subscriber Identity. Such methods may further comprise the step of interrogating a database of users' details to obtain the identity of the user, based on the information that identifies the user.

The invention is not restricted to the features of the described embodiments. It will be readily apparent to those skilled in the art that it is possible to embody the invention in specific forms other than those of the preferred embodiments described above. The invention is defined in the following claims.

The invention claimed is:

1. A system for extracting information pertaining to a portable wireless communications device which is connectable to a cellular communication network comprising:
    a mobile enclosure arranged so as to be substantially impenetrable by electromagnetic radiation and sized so as to comprise height, width, and depth each of less than one meter;
    a transmitter disposed within the enclosure;
    a receiver disposed within the enclosure;
    a controller configured to control the transmitter and receiver to generate a cell of a cellular communication network within the enclosure; and
    a processor in communication with the generated cell;
    wherein the controller is further configured to:
        control the transmitter to transmit a registration signal to said portable wireless communications device when the device is disposed within the mobile enclosure, the transmitted registration signal being suitable for initiating registration of the device with the cell generated within the enclosure, and
        control the receiver to receive a response signal from the device, the received response signal being suitable for registering the device with the cell generated within the enclosure, the received response signal comprising information pertaining to the device; and
    wherein the processor is arranged to extract the information pertaining to the device from the received response signal.

2. The system of claim 1, wherein the cell generated within the enclosure of the cellular communication network comprises one of an access point base station; a femtocell; a picocell; or a microcell.

3. The system of claim 1, wherein the processor is further arranged to generate a message for transmission to the device.

4. The system of claim 3, wherein content of the message is dependent upon the extracted information.

5. The system of claim 3, wherein the controller is further configured to control the transmitter to transmit the message to the device.

6. The system of claim 1, wherein the extracted information comprises at least one of the following:
    an International Mobile Subscriber Identity;
    a Mobile Country Code;
    a Mobile Network Code;
    a Mobile Station Identification Number;
    an International Mobile Equipment Identity; and
    a Type Allocation Code.

7. The system of claim 1, wherein the extracted information is used to determine at least one of:
    device manufacturer;
    device type;
    device model;
    device's home country; and
    device's home cellular network.

8. The system of claim 1, further comprising a database having a plurality of data entries related to information pertaining to portable wireless communications devices therein and wherein the processor is further arranged to correlate the extracted information with at least one of the data entries.

9. The system of claim 1, wherein the controller is further configured to control the transmitter and the receiver to emulate a cell of the cellular communication network.

10. The system of claim 1, wherein the controller is further configured to control the transmitter and the receiver to emulate a cell of the cellular communication network based upon the extracted information.

11. The system of claim 1, wherein the controller is further configured to control the transmitter and the receiver to use the extracted information to register the device with the generated cell so as to connect the device thereto.

12. The system of claim 1, wherein the enclosure is substantially impenetrable by external electromagnetic radiation of a frequency between 500-3,000 Mhz.

13. The system of claim 1, wherein the enclosure is formed of a material substantially impervious to external electromagnetic radiation whose thickness exceeds the skin depth electromagnetic radiation having a frequency between 500-3,000 Mhz.

14. The system of claim 1, wherein the enclosure is formed so as to be devoid of holes whose dimensions are greater than the wavelengths of electromagnetic radiation having a frequency between 500-3,000 Mhz.

15. The system of claim 1, wherein the controller comprises at least one of:
    a) a computer running software that emulates functionality of a base station controller;
    b) a link to a cellular network operator's existing base station or network of base stations such that the transceiver is controlled thereby; and
    c) custom hardware configured to emulate the functionality of the base station controller.

16. A method for extracting information pertaining to a portable wireless communications device which is connectable to a cellular communication network, the method comprising the steps of:
    receiving the portable wireless communications device within a mobile enclosure that completely surrounds the device, the enclosure being substantially impenetrable by electromagnetic radiation and sized so as to comprise height, width, and depth each of less than one meter;
    generating a cell of a cellular communication network within the enclosure;
    transmitting a registration signal to the device, the transmitted registration signal being suitable for initiating registration of the device with the generated cell;
    receiving a response signal from the device comprising information pertaining to the device, the received response signal being suitable for registering the device with the generated cell; and
    extracting information pertaining to the device from the received response signal.

17. The method of claim 16, further comprising the step of registering the device with the generated cell.

18. The method of claim 16, further comprising the step of generating a message dependent upon the extracted information.

19. The method of claim 18, further comprising the step of transmitting the message to the device via the generated cell.

20. The method of claim 16, wherein the step of generating a cell comprises emulating a cell of a cellular communication network.

21. The method of claim 20, further comprising the step of determining further information based on the extracted information.

22. The method of claim 16, wherein the extracted information comprises information that identifies the user of the device.

23. The method of claim 22, wherein the information that identifies the user comprises the Mobile Station Identification Number that forms part of the International Mobile Subscriber Identity.

24. The method of claim 22, further comprising the step of interrogating a database of users' details to obtain the identity of the user, based on the information that identifies the user.

* * * * *